US012686644B1

(12) United States Patent　　　　　(10) Patent No.:　　US 12,686,644 B1

Fowler et al.　　　　　　　　　　　　(45) Date of Patent:　　　Jul. 21, 2026

(54) METHOD OF MAKING A CARBON-CARBON COMPOSITE WITH INTERNAL MICROCHANNELS

(71) Applicant: Cornerstone Research Group, Inc., Miamisburg, OH (US)

(72) Inventors: Gray E. Fowler, Allen, TX (US); James M. Davidson, Miamisburg, OH (US); Garrett U. Yoder, Springboro, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 160 days.

(21) Appl. No.: 18/495,511

(22) Filed: Oct. 26, 2023

Related U.S. Application Data

(62) Division of application No. 17/941,295, filed on Sep. 9, 2022.

(Continued)

(51) Int. Cl.
　　*C04B 35/83*　　　　(2006.01)
　　*B29C 70/00*　　　　(2006.01)
　　(Continued)

(52) U.S. Cl.
　　CPC ............ *C04B 35/83* (2013.01); *B29C 70/003* (2021.05); *B29C 70/021* (2013.01); *B29C 70/36* (2013.01); *C04B 35/71* (2013.01); *B29C 2791/006* (2013.01); *B29K 2077/00* (2013.01); *B29K 2105/0845* (2013.01); *B29K 2301/00* (2013.01);
　　(Continued)

(58) Field of Classification Search
　　None
　　See application file for complete search history.

(56) References Cited

U.S. PATENT DOCUMENTS 6,294,125 B1　　9/2001　Bridgewater et al.
9,302,946 B2　　4/2016　Ritti et al.
　　　　　　　(Continued)

FOREIGN PATENT DOCUMENTS

CN　　　　107868682 A　*　4/2018　................ C10L 1/10

OTHER PUBLICATIONS

US Non-Final Office Action dated Mar. 28, 2024 from related U.S. Appl. No. 17/941,295, filed Sep. 9, 2022.

*Primary Examiner* — Seth Dumbris

(74) *Attorney, Agent, or Firm* — Dinsmore & Shohl, LLP

(57) ABSTRACT

Methods of making a carbon-carbon composite structure with internal microchannels include (i) assembling a dry carbon fiber composite preform with a sacrificial template woven or placed within to form a primary assembly; (ii) placing the primary assembly under a sealed enclosure; (iii) applying a vacuum to the sealed enclosure to evacuate air from the dry carbon fiber composite preform; (iv) infusing a polymer resin into the dry carbon fiber composite preform to generate a resin infused preform; (v) heating the resin infused preform under vacuum to cure the polymer resin in the resin infused preform to form a cured composite; (vi) demolding the cured composite; and (vii) heating the cured composite to an elevated temperature of at least 800° C. under a flow of an inert gas to decompose the sacrificial template to form the internal microchannels and carbonize the cured composite to form the carbon-carbon composite structure.

12 Claims, 4 Drawing Sheets

Related U.S. Application Data

(60) Provisional application No. 63/242,530, filed on Sep. 10, 2021.

(51) Int. Cl.

| | |
|---|---|
| B29C 70/02 | (2006.01) |
| B29C 70/36 | (2006.01) |
| C04B 35/71 | (2006.01) |
| *B29K 77/00* | (2006.01) |
| *B29K 105/08* | (2006.01) |
| *B29K 301/00* | (2006.01) |
| *B29L 31/30* | (2006.01) |

(52) U.S. Cl.
CPC ...... *B29L 2031/3005* (2013.01); *Y10T 428/30* (2015.01)

(56) References Cited

U.S. PATENT DOCUMENTS

| | | |
|---|---|---|
| 10,328,604 B2 | 6/2019 | Podgorski et al. |
| 2004/0216463 A1 * | 11/2004 | Harris ...................... F23R 3/50 |
| | | 60/776 |
| 2005/0118392 A1 | 6/2005 | Millard et al. |
| 2006/0068150 A1 | 3/2006 | Henrich et al. |
| 2014/0193274 A1 * | 7/2014 | Thompson, Jr. ........ F01D 5/185 |
| | | 416/97 R |
| 2018/0057191 A1 * | 3/2018 | Zhang .................... F42B 10/40 |
| 2018/0328187 A1 | 11/2018 | Oke |
| 2018/0328189 A1 * | 11/2018 | Frey ...................... C04B 35/571 |
| 2020/0346983 A1 * | 11/2020 | Read ...................... C04B 35/80 |
| 2021/0189901 A1 * | 6/2021 | Dyson ................ C04B 38/0615 |

* cited by examiner

METHOD OF MAKING A CARBON-CARBON COMPOSITE WITH INTERNAL MICROCHANNELS

CROSS-REFERENCE TO RELATED APPLICATIONS

This application claims is a divisional application of co-pending U.S. application Ser. No. 17/941,295 filed Sep. 9, 2022, which claims priority to U.S. Provisional Application 63/242,530, filed Sep. 10, 2021, which are incorporated by reference herein in their entirety.

STATEMENT REGARDING FEDERALLY SPONSORED RESEARCH OR DEVELOPMENT

This invention was made with U.S. Government support under Contract No. 140D0419C0101 awarded by Defense Advanced Research Project Agency to Cornerstone Research Group Inc. The U.S. Government has certain rights in the invention.

TECHNICAL FIELD

Embodiments of the present disclosure relate to methods of preparing carbon-carbon (C—C) composite structures and more specifically methods of preparing carbon-carbon composite structures with internal microchannels for flowing a cooling fluid through.

BACKGROUND

The demand for high temperature composite materials, primarily driven by a renewed interest in space exploration and hypersonic systems development, as aerothermal heating at the leading edges and select flight surfaces of high speed vehicle presents major challenges. As the need for faster, more advanced hypersonic systems grows, new materials and architected structures are required to meet the demanding requirements.

Lightweight, high temperature composites are critical enabling materials for the advancement of space and hypersonic systems. However, there are presently limited options in materials for construction capable of delivering desired mechanical performance at temperatures in excess of 2000° C. Carbon-carbon composite materials are suitable for high temperature applications, but generally require protection from oxidation to prevent material recession at temperatures above 600° C. Such oxidation resistance of carbon-carbon composite is typically imparted through thin ceramic coatings or oxidation inhibitors impregnated within the carbon matrix or reinforcement. For leading edge designs, oxidation resistant coatings have been demonstrated to provide adequate protection at high temperatures and heat fluxes for a limited period of time as coating reliability and durability present limitations for such technologies. Spallation and weak adherence are two of the main challenges associated with coatings and are exacerbated as coating thickness increases.

Coatings and oxidation inhibitors are passive means to protect against ablation. Another option is to employ active cooling to prevent the structure from ever reaching temperatures where erosion will occur. Active cooling technology for hypersonics has been researched periodically over the past 50 years; however, transition out of laboratory settings has been limited by materials, manufacturing methods, and excessive support infrastructure.

SUMMARY

As such, there is an ongoing need for alternative processes and material architectures to control the temperature of composite materials in high temperature environments. Thus, new composite architecture and manufacturing process are needed to advance and facilitate affordable actively cooled carbon-carbon composite for hypersonics and other high temperature applications. The present embodiments address these needs by providing a carbon-carbon composite structure with internal microchannels through which a cooling fluid may be actively cooled. The present embodiments also address advancements in the manufacturing process to prepare such carbon-carbon composite structure with internal microchannels.

Embodiments of the present disclosure relate to methods of making a carbon-carbon composite structure with internal microchannels. The methods include assembling a dry carbon fiber composite preform with a sacrificial template formed from a sacrificial material woven or placed into the dry carbon fiber composite preform to form a primary assembly. The sacrificial template extends in a continuous manner from a first end of the dry carbon fiber composite preform to a second end of the dry carbon fiber composite preform. The methods further includes placing the primary assembly under a sealed enclosure and applying a vacuum to the sealed enclosure to evacuate air from within the sealed enclosure and the dry carbon fiber composite preform. Further, the methods include infusing a polymer resin into the dry carbon fiber composite preform to generate a resin infused preform and subsequently heating the resin infused preform under vacuum to cure the polymer resin in the resin infused preform to form a cured composite. The methods also include demolding the cured composite; and then heating the cured composite to an elevated temperature of at least 800° C. under a flow of an inert gas to decompose the sacrificial template to form the internal microchannels and carbonize the cured composite to form the carbon-carbon composite structure.

Embodiments of the present disclosure additionally relate to methods of making a carbon-carbon composite structure with internal microchannels where the methods also include introducing a second sacrificial template formed from a second sacrificial material into the microchannels of the carbon-carbon composite structure to generate a secondary assembly. The secondary assembly is then processes in the same manner as the primary assembly.

Embodiments of the present disclosure relate to carbon-carbon composite cooling structures. The carbon-carbon composite cooling structures include a carbon-carbon composite comprising microchannels extending in a continuous manner from a first end of the carbon-carbon composite to a second end of the carbon-carbon composite and a cooling fluid which is flowed through the microchannels.

BRIEF DESCRIPTION OF THE DRAWINGS

The following detailed description of specific embodiments of the present disclosure can be best understood when read in conjunction with the following drawings, in which.

DETAILED DESCRIPTION

Figure 1A:
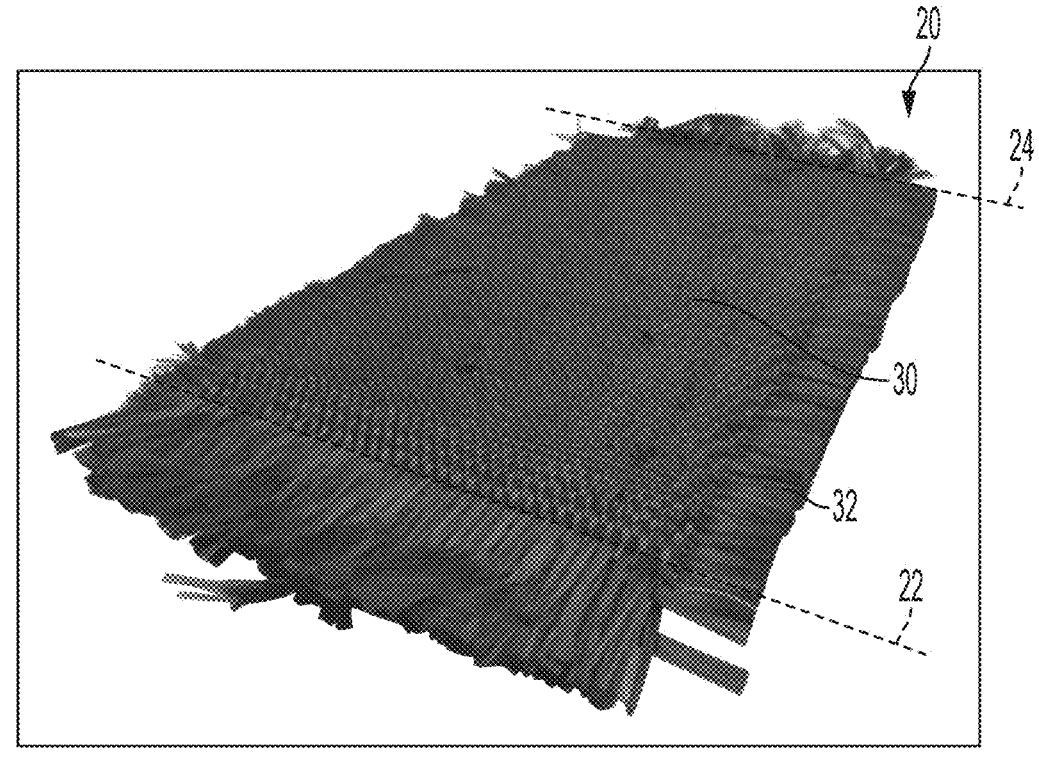
FIG. 1A is a photograph of a primary assembly according to one or more embodiments of the present disclosure.
Figure 1B:
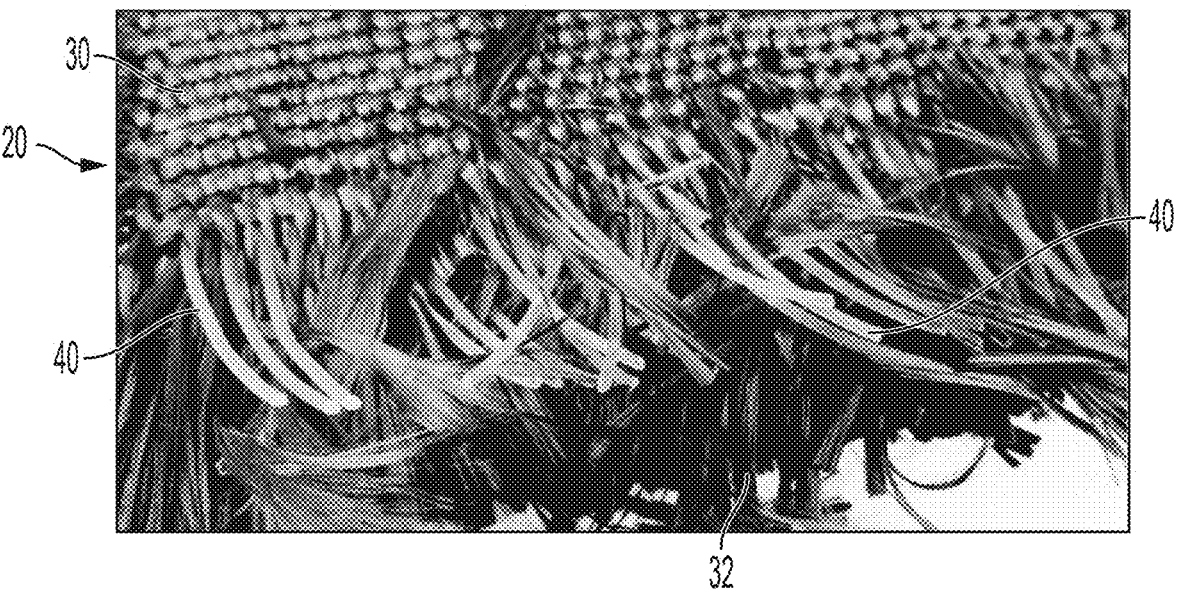
FIG. 1B is a photograph of an end of the primary assembly of FIG. 1A.
Figure 2A:
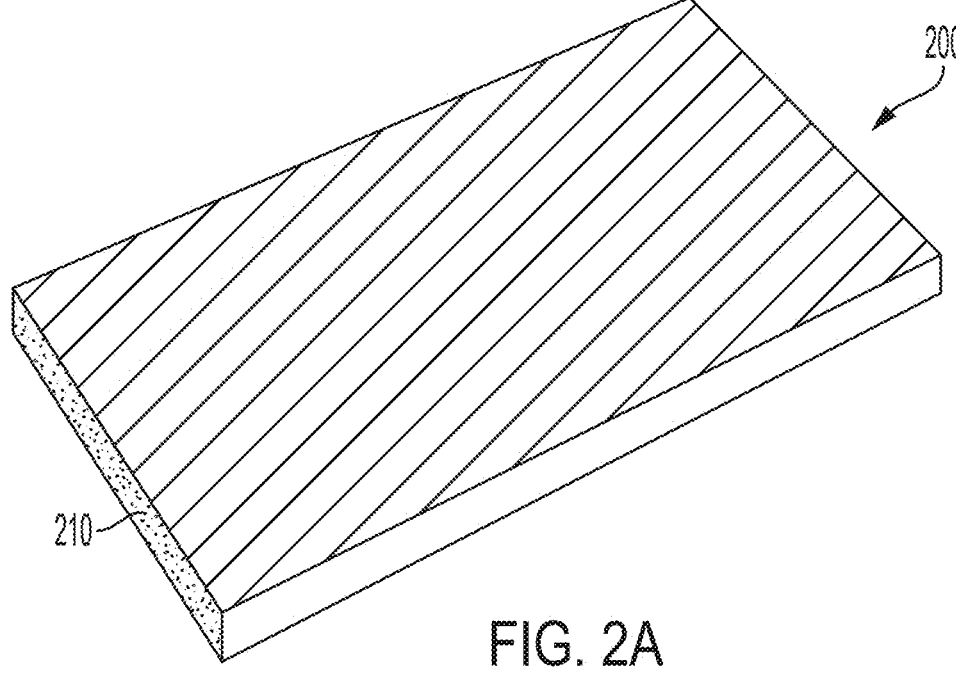
FIG. 2A is an illustration of a carbon-carbon composite structure with internal microchannels according to one or more embodiments of the present disclosure.
Figure 2B:
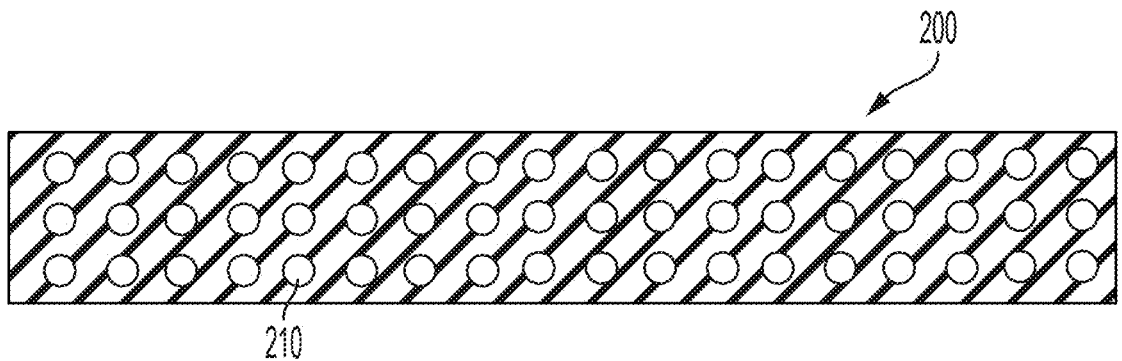
FIG. 2B is an end view of the carbon-carbon composite structure with internal microchannels of FIG. 2A.

Embodiments of the present disclosure generally relate to carbon-carbon composite structures with internal microchannels and methods of forming the same. The internal microchannels allow for passage of a cooling fluid through the carbon-carbon composite structure to regulate the temperature of the same when implemented as part of structures operating in a high heat environment. Specifically, embodiments of the carbon-carbon composite structure with internal microchannels and associated methods to manufacture the same enables an internal flow convective cooling process to be implemented in a carbon-carbon composite for operation in extremely high heat environments. Generally, the design of the carbon-carbon composite structure includes hollow microchannels built into the carbon-carbon composite structure during the composite fabrication process such that a selected cooling fluid may be flowed through the microchannels when the composite is used for applications that requires active cooling.

In accordance with embodiments of the method of making a carbon-carbon composite structure with internal microchannels, the method comprises a series of steps. The method initially comprises (i) assembling a dry carbon fiber composite preform with a sacrificial template formed from a sacrificial material woven or placed into the dry carbon fiber composite preform to form a primary assembly. The sacrificial template extends in a continuous manner from a first end of the dry carbon fiber composite preform to a second end of the dry carbon fiber composite preform. The method further comprises (ii) placing the primary assembly under a sealed enclosure and (iii) applying a vacuum to the sealed enclosure to evacuate air from within the sealed enclosure and the dry carbon fiber composite preform. Further, the method comprises (iv) infusing a polymer resin into the dry carbon fiber composite preform to generate a resin infused preform. Subsequently, the method comprises (v) heating the resin infused preform under vacuum to cure the polymer resin in the resin infused preform to form a cured composite. Finally, the method comprises (vi) demolding the cured composite and (vii) heating the cured composite to an elevated temperature of at least 800° C. under a flow of an inert gas to decompose the sacrificial template to form the internal microchannels and carbonize the cured composite to form the carbon-carbon composite structure.

In one or more embodiments, the method further comprises a step of (viii) introducing a second sacrificial template formed from a second sacrificial material into the microchannels of the carbon-carbon composite structure created in step (vii) to generate a secondary assembly and (ix) repeating steps (ii) to (vii) with the secondary assembly in place of the primary assembly. Each sequential repetition of steps (viii) and (ix) results in densification of the carbon-carbon composite forming the carbon-carbon composite structure. As such, steps (viii) and (ix) may be repeated a sufficient number of times to generate a carbon-carbon composite structure with desired properties including a maximized bulk density or reduction in accessible void space (that is, porosity) below a desired threshold. In various embodiments, steps (viii) and (ix) are repeated at least one time (two densifications cycles), at least two times, at least three times, at least four times, or at least five times.

Having generally described methods of making a carbon-carbon composite structure with internal microchannels, the specific steps and components will now be described in further detail.

With reference to FIGS. 1A, 1B, 2A, and 2B, embodiments of the method of making a carbon-carbon composite structure 200 with internal microchannels 210 include assembling a dry carbon fiber composite preform 30 with a sacrificial template 40 formed from a sacrificial material woven or placed into the dry carbon fiber composite preform 30 to form a primary assembly 20.

The dry carbon fiber composite preform 30 comprises at least one carbon-based reinforcement material 32 which may be chosen based on the desired application of use. In various embodiments, the carbon-based reinforcement material 32 may be carbon fiber, random carbon mats, carbon fiber scrims, chopped carbon fibers, carbon fiber knits, unidirectional carbon fiber plies, three-dimensional carbon fiber weaves, three-dimensional carbon fiber preforms, plain weave fabric, twill fabrics, or combinations thereof. It will be appreciated that the dry carbon fiber composite preform 30 may also be formed of pre-preg fibers comprising the at least one carbon-based reinforcement material 32.

The carbon-based reinforcement material 32 may be a unidirectional fibrous or a woven fabric material, and in some embodiments, may be arranged in a 0° and 90° or 0°, 45°, and 90° orientation between layers to provide structural support or may be in any other layup or laminate arrangements known in the industry. The carbon-based reinforcement material 32 may be in a braided, woven, plain weave, twill weave, satin weave, in a symmetric or non-symmetric laminate stack, in any other known configuration, or in any combination of configurations.

In accordance with the various embodiments of making a carbon-carbon composite structure 200 with internal microchannels 210, the internal microchannels 210 are formed by decomposing the sacrificial template 40 present in the cured composite to form void space. The decomposition of the sacrificial template 40 may be completed with heating of the sacrificial template 40 to break down the structural integrity of the sacrificial template 40. In various embodiments, the sacrificial material forming the sacrificial template 40 may be converted from a solid to one or more gases gas, from a solid to a flowable liquid, from a solid to a combination of one or more gases and a flowable liquid. For purposes of the present disclosure "decomposition" of the sacrificial template 40 means the structural integrity of the sacrificial template 40 is altered such that the resulting decomposed sacrificial material may naturally flow away from the cured composite to express the internal microchannels 210 or may be flowed away from away from the cured composite to express the internal microchannels 210 through a flushing operation. It will be appreciated that a flushing operation may be desirable to remove any ash or other carbonaceous residue left from decomposition of the sacrificial template 40.

In various embodiments the sacrificial template 40 comprises one or more of a plurality of fibers or filaments, a plurality of strands, or a plurality of tapes. For purposes of this disclosure "fibers" and "filaments" are individual lengths of material generally with a circular or substantially circular profile such as an oval, a star, a regular polygon. For purposes of this disclosure "strands" are a plurality of fibers or filaments which have been twisted or plaited to form an interlocked structure such as yarn, thread, rope, or cordage. For purposes of this disclosure "tapes" are individual lengths of material generally with a profile having disparate height and width dimensions, and in specific embodiments a rectangular profile.

The sacrificial template 40 is formed from a sacrificial material. In one or more embodiments, the sacrificial template 40 comprises thermoplastic. In various embodiments, the thermoplastic forming the sacrificial template 40 may be nylon, acrylonitrile butadiene styrene (ABS), or polyethylene (PE). In one or more specific embodiments, the sacrificial template 40 comprises nylon.

In accordance with the various embodiments of methods of making a carbon-carbon composite structure 200 with internal microchannels 210, the sacrificial template 40 extends in a continuous manner from a first end 22 of the dry carbon fiber composite preform 30 to a second end 24 of the dry carbon fiber composite preform 30.

In one or more embodiments, the sacrificial template 40 comprises thermoplastic monofilaments. Monofilaments represent a single filament, fiber, strand, or tape of the sacrificial material which forms the sacrificial template 40. The thermoplastic monofilament may be laid out with a single monofilament forming each microchannel 210 of the carbon-carbon composite structure 200. In further embodiments, a plurality of monofilaments may be laid in an abutting arrangement such that the void formed from the plurality of monofilaments forms a single contiguous microchannel 210.

It will be appreciated that the dimensions of the microchannels 210 formed in the carbon-carbon composite structure 200 will substantially match the dimensions of the sacrificial template 30 assembled with the dry carbon fiber composite preform 30 in the primary assembly 20. Specifically, the cured composite is formed with the sacrificial template 40 in place such that upon removal of the sacrificial template 40, the resulting voids forming the microchannels 210 reflect the geometry of the removed sacrificial template 40.

In various embodiments, the microchannels 210 have a longest cross-sectional dimension of 100 to 2000 microns, 100 to 1500 microns, 100 to 1000 microns, 500 to 2000 microns, 1000 to 2000 microns, or 500 to 1500 microns. The size or cross-sectional dimension of the microchannels 210 may be selected based on the cooling fluid intended to be flowed through the microchannels 210. For example, the rheology, the heat capacity, the flow rate, and other parameters of the cooling fluid to be flowed through the microchannels 210 may affect selection of the cross-section dimension of the microchannels 210.

In various embodiments, the microchannels 210 may form up to 10%, up to 20%, up to 30%, up to 40%, up to 50%, 10% to 50%, 20% to 50%, 10% to 40%, 10% to 30%, or 20% to 40% of a total cross section of the carbon-carbon composite structure 200.

In one or more embodiments, the sacrificial template 40 is placed into the dry carbon fiber composite preform 30 to form the primary assembly 20 using a Tailored Fiber Placement (TFP) process. As generally familiar to one skilled in the art, TFP is a processes for laying out the fiber for a composite structure based on the principle of sewing. TFP allows for a continuous placement of fibrous material for composite components. The fibrous material is fixed with an upper and lower stitching thread on a base material. Compared to other textile manufacturing processes fiber material can be placed near net-shape in curvilinear patterns upon a base material in order to create stress adapted composite parts.

Figure 3:
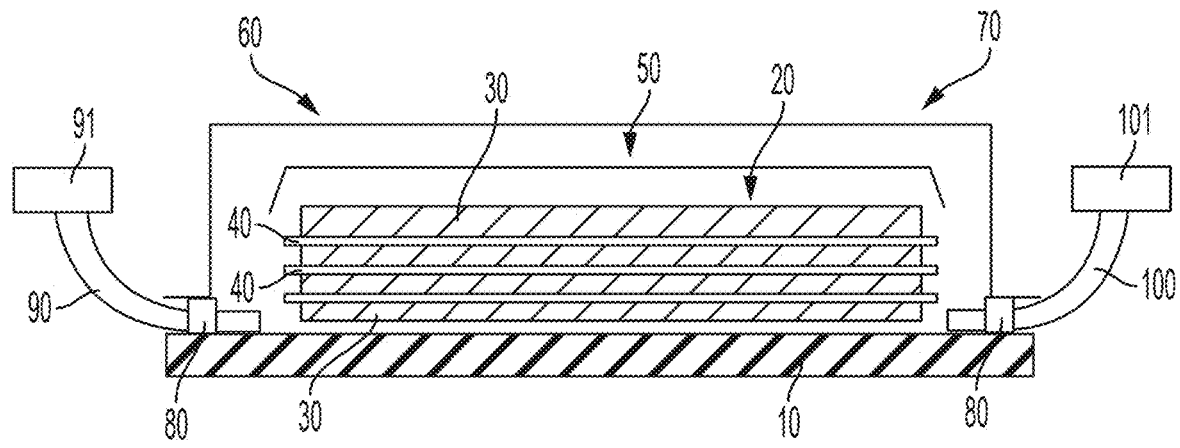
FIG. 3 is a schematic illustration of a vacuum bagging scheme according to one or more embodiments of the present disclosure.

With reference to FIG. 3, embodiments of the method of making a carbon-carbon composite structure with internal microchannels include placing the primary assembly 20 under a sealed enclosure 70. Specifically, in one or more embodiments, a vacuum is subsequently applied to the primary assembly 20 of the dry carbon fiber composite preform 30 with the sacrificial template 40 woven or placed within the dry carbon fiber composite preform 30. The vacuum is introduced to evacuate air from within the sealed enclosure 70 and draw air out of the dry carbon fiber composite preform 30. Further, placing the primary assembly 20 under the sealed enclosure 70 includes forming the sealed enclosure by sealing or adhering a vacuum bag 60 to an impermeable substrate 10 such that the assembly is isolated from the surrounding atmosphere.

In one or more embodiments, a breather cloth 50 is placed over the primary assembly 20 when the primary assembly 20 of the dry carbon fiber composite preform 30 and sacrificial template 40 are placed under the sealed enclosure 70. The breather cloth 50 generally allows passage of gases from the primary assembly 20 to a vacuum port or vacuum conduit 100 where air and gases are removed from the sealed enclosure 70. In the absence of a breather cloth 50 the vacuum bag 60 of the sealed enclosure 70 may be pressed against the primary assembly 20 and form a seal, thereby impeding passage of gases to the vacuum port or vacuum conduit 100. Breather cloths are commonly utilized with vacuum infusion and the implementation and placement of breather cloths is known to those skilled in the art and may alternatively be referenced as a bleeder cloth. The breather cloth 50 is addressed in further detail infra.

With reference to FIG. 3, the positioning of the various components utilized in one or more embodiments of the making a carbon-carbon composite structure with internal microchannels is illustrated. An impermeable substrate 10 is provided as a base layer upon which the primary assembly 20 of the dry carbon fiber composite preform 30, the sacrificial template 40, the breather cloth 50, and the vacuum bag 60 are assembled. The combination of the impermeable substrate 10 and the vacuum bag 60 form the sealed enclosure 70 where the primary assembly 20 is placed for processing.

Embodiments of the method of making a carbon-carbon composite structure with internal microchannels include applying a vacuum to the sealed enclosure 70 to evacuate air from within the sealed enclosure 70 and the dry carbon fiber composite preform 30. In one or more embodiments, the impermeable substrate 10, the primary assembly 20, and the breather cloth 50 are covered and sealed with the vacuum bag 60. The vacuum bag 60 may encompass various components suitable for achieving a sealed environment, for example, a container or polymer vacuum bagging film may be used to achieve a sealed environment. The vacuum bag 60 is generally affixed to the impermeable substrate 10 via a seal 80 in the form of an adhesive, peelable adhesive film, adhesive tape, putty, or combinations thereof.

Generation of a vacuum environment within the sealed enclosure 70 by evacuating air from within the sealed enclosure additionally draws air out from within the primary assembly 20 including the dry carbon fiber composite preform 30. Specifically, vacuum is applied to the primary assembly 20 within the sealed enclosure 70 so that the dry carbon fiber composite preform 30 is substantially fully evacuated of air prior to introduction of polymer resin for infusion within the dry carbon fiber composite preform 30.

It will be appreciated that the strength of the vacuum generated within the sealed enclosure 70 is desirably as great as possible. For purposes of this disclosure, indication that a vacuum is 0 inches of mercury (inHg) indicates that no vacuum is applied and indication that a vacuum is 29.92 inHg indicates that a complete or perfect vacuum is achieved. In various embodiments, the vacuum applied to the sealed enclosure 70 to evacuate air from within the sealed enclosure 70 and the dry carbon fiber composite preform 30 is 25 inHg or greater, 26 inHg or greater, 27.5 inHg or greater, or 29 inHg or greater.

With continued reference to FIG. 3, in one or more embodiments, the breather cloth 50 is disposed between the primary assembly 20 and the vacuum bag 60. The breather cloth 50 is a sheet of material placed adjacent the primary assembly 20 that provides a route for gases to escape. In the absence of the breather cloth 50, under vacuum the vacuum bag 60 may collapse down and seal off air flow to the vacuum source and prevent egress of gases from the primary assembly 20. The presence of the breather cloth 50 forms a breathable boundary layer between the primary assembly 20 and the vacuum bag 60 which allows vacuum to reach the dry carbon fiber composite preform 30 and a route for gases to escape the reach the dry carbon fiber composite preform 30. In one or more embodiments, the breather cloth 50 is formed from a polymer fabric. An example material for formation of the breather cloth 50 is Ultraweave 606, a woven nylon mat, which is commercially available from Airtech International, Huntington Beach, California.

Embodiments of the method of making a carbon-carbon composite structure with internal microchannels include infusing a polymer resin into the dry carbon fiber composite preform to generate a resin infused preform. Generally polymer resin is introduced into the dry carbon fiber composite preform 30 at one or more locations via a resin conduit 90 from a polymer resin source 91 with a vacuum conduit 100 connected to a vacuum source 101 positioned at a distal location to draw the polymer resin through the primary assembly 20 and more particularly the dry carbon fiber composite preform 30. A leading edge of polymer resin passes from the point or points of resin injection at the terminus of the resin conduit 90 toward the vacuum conduit 100. Various materials are contemplated for the vacuum conduits 100 and the resin conduits 90. In one or more embodiments, flexible tubing such as a Polytetrafluoroethylene (PTFE) or polyethylene tube with rigid spiral plastic wrap inside may be utilized. The resin conduit 90 may be comprised of any material suitable for exposure to the liquid resin. In one or more embodiments, the vacuum conduit 100 may be a vacuum port in lieu of an extended conduit. The vacuum port may be of any style known to those skilled in the art.

In one or more embodiments, the polymer resin infused into the dry carbon fiber composite preform 30 may be selected from any resins that exhibit desirable rheological properties. For example, in one or more embodiments, the resins may be selected to be infusible up to 60° C. with a viscosity of less than 5000 centipoise.

In various embodiments, the polymer resin is selected from polyimide resin, phenolic resin, benzoxazine, phthalonitrile, cyanate ester, MG resin, or combinations thereof. An example MG resin is MG 1843. Various phenolic resins are commercially available as the Durite line of resins from Hexion, Columbus, Ohio and the Phenalloy line of resins from Dynachem, Westerville, Illinois.

In one or more embodiments, infusing the polymer resin into the primary assembly 20 including the dry carbon fiber composite preform 30 to form the resin infused preform is conducted with a pressure differential between the primary assembly 20 including the dry carbon fiber composite preform 30 and a source of the polymer resin. In one or more embodiments, a positive pressure is applied to drive the polymer base resin into the dry carbon fiber composite preform 30. In further embodiments, solely a vacuum is applied at the dry carbon fiber composite preform 30 to draw the polymer resin into the dry carbon fiber composite preform 30. Generalized methods of infusing a polymer resin into a carbon fiber preform such as the dry carbon fiber composite preform 30 are generally known to those skilled in the art and as such, for conciseness, further details of the infusion process are omitted.

In one or more embodiments, the vacuum is applied in the sealed enclosure 70 to evacuate air from within the primary assembly 20 and is held for a period of time in a hold period before infusing the polymer resin onto the dry carbon fiber composite preform 30. In various embodiments, the primary assembly 20 is held under vacuum in the sealed enclosure 70 with a hold period at least one minute, at least 2 minutes, at least 5 minutes, or at least 10 minutes before initiation of the polymer resin infusion procedures. The hold period provides opportunity for air deep within the dry carbon fiber composite preform 30 of the primary assembly 20 to be drawn out and evacuated before initiation of resin infusion processes.

In one or more embodiments, the primary assembly 20 is held under vacuum for an infusion holding period after introduction of the polymer resin to allow the polymer resin to infuse into the dry carbon fiber composite preform 30 and fully saturate the dry carbon fiber composite preform 30 with polymer resin. As an operator can't see the degree of infusion of the polymer resin during infusion operations and it is undesirable to remove the sealed enclosure 70 to gauge and analyze the degree of infusion of the resin into the dry carbon fiber composite preform 30, the infusion holding period is provided to provide a measured confidence that sufficient time is provided to achieve appropriate resin infusion. In various embodiments, the infusion holding period is at least 1 hour, at least 2 hours, 1 to 2 hours, 1 to 1.5 hours, or 1.5 to 2 hours. It will be appreciated that infusion holding periods of longer than 2 hours are possible and equally contemplated in one or more embodiments, but are believed unnecessarily extended given appropriate viscosity of the polymer resin during infusion. The period of the infusion holding period may be measured from the time when the polymer resin is first introduced into the dry carbon fiber composite preform 30.

It will be appreciated that compressive forces may be applied to the primary assembly 20 by virtue of the primary assembly being under the sealed enclosure 70 with an applied vacuum. Specifically, the applied vacuum to the sealed enclosure 70 results in the sealed enclosure 70 attempting to achieve a minimal interior volume which results in the vacuum bag 60 collapsing and compressing the primary assembly 20. This compressive force presses the polymer resin into the dry carbon fiber composite preform 30.

In one or more embodiments an external pressure is also applied to the primary assembly 20 subsequent to or in conjunction with the infusion holding period to force the polymer resin into the dry carbon fiber composite preform 30 before initiation of resin curing. In one or more embodiments, the infusion of the polymer resin into the dry carbon fiber composite preform 30 to generate a resin infused preform may be completed in an autoclave. As such, the autoclave may be pressurized to compress the sealed enclosure and force residual resin into dry carbon fiber composite preform. In one or more embodiments the pressure is applied concurrent with the infusion holding period. In one or more embodiments, the pressure is applied subsequent to the infusion holding period. In one or more embodiments, the external pressure that is applied to the assembly subsequent to or in conjunction with the infusion holding period is applied for 1 to 120 minutes. In one or more embodiments, the external pressure that is applied to the assembly subsequent to or in conjunction with the infusion holding period is applied in the range of 50 pounds per square inch (psi) to 500 psi. For example, in various embodiments, the external pressure is 50 to 300 psi, 100 to 500 psi, 100 to 300 psi, 150 to 250 psi, or approximately 200 psi.

Embodiments of the method of making a carbon-carbon composite structure with internal microchannels include heating the resin infused preform while maintaining the vacuum to cure the polymer resin in the resin infused preform to form a cured composite. The specific curing temperature and time is resin specific. Example curing times and temperatures are provide in Table 1 provided infra.

TABLE 1

| Example Resin Curing Times and Temperatures | | |
| --- | --- | --- |
| Resin | Curing Temperature | Curing Time |
| MG 1843 | 215° C. | 120 minutes |
| Phenolic resin | 165° C. | 60 minutes |
| Benzoxazine resin | 200° C. | 120 minutes |

Embodiments of the method of making a carbon-carbon composite structure with internal microchannels include demolding the cured composite. Specifically, the cured composite is removed from the sealed enclosure and separated from any molds or other components utilized in the shaping, infusion, and/or curing process.

Embodiments of the method of making a carbon-carbon composite structure with internal microchannels finally include carbonizing the infused resin which has been cured within the cured composite in accordance with a conventional process known in the industry. The process of heating to carbonize the infused resin also decomposes the sacrificial template 40 to generate voids and form the internal microchannels 210 within the carbon-carbon composite structure 200.

In one or more embodiments, carbonizing the infused resin which has been cured within the cured composite and decomposing the sacrificial template 40 is completed in an inert gas environment. An inert gas environment is an atmosphere formed from substantially only one or more inert gases. In various embodiments the inert gas provided in the inert gas environment may be nitrogen or argon. In one or more embodiments, the inert gas environment comprises a nitrogen atmosphere of at least 99% purity by volume. In one or more embodiments, the inert gas environment comprises an argon atmosphere of at least 99% purity by volume. Specifically, the air atmosphere in the oven or autoclave where carbonization is completed may be evacuated and replaced with the inert gas environment, such as a nitrogen gas atmosphere, for heating to carbonize the infused resin. The inert gas environment results in carbonization of the cured resin, but protects the resulting carbonized material from oxidation and further decomposition to carbon dioxide.

In one or more embodiments, carbonization of the cured composite and decomposing the sacrificial template 40 is achieved by heating the cured composite to an elevated temperature of at least 800° C. In various further embodiments, the carbonization of the cured composite and decomposing the sacrificial template 40 is achieved by heating the cured composite to an elevated temperature of between 800° C. and 2400° C., 900° C. and 1650° C., 900° C. and 1400° C., 900° C. and 1250° C., or 900° C. and 1100° C. For example, the cured composite may be heated to an elevated temperature of 900° C. to 1250° C. under a constant flow of argon gas to form the carbon-carbon composite structure 200. The specific carbonization temperature is resin specific. Carbonization temperatures for example resins are provide in Table 2 provided infra. Similarly, the specific temperature necessary to decompose the sacrificial template 40 is specific to the particular sacrificial material utilized to form the sacrificial template 40. Decomposition temperatures for example sacrificial materials are provide in Table 3 provided infra.

TABLE 2

| Example Resin Carbonization Temperatures | |
| --- | --- |
| Resin | Carbonization Temperature |
| MG 1843 | 900° C. |
| Phenolic resin | 900° C. |
| Benzoxazine resin | 900° C. |

TABLE 3

| Example Sacrificial Material Decomposition Temperatures | |
| --- | --- |
| Sacrificial Material | Decomposition Temperature |
| Nylon | 438° C. |
| Acrylonitrile butadiene styrene (ABS) | 400° C. |
| Polyethylene (PE) | 370-510° C. ° C. |

In one or more embodiments, the cured composite is held at the elevated temperature to carbonize the cured resin and decompose the sacrificial template 40 for at least 1 hour. In various further embodiments, the hold time at the elevated temperature is at least 90 minutes, at least 2 hours, at least 3 hours, or at least 4 hours.

Figure 4:
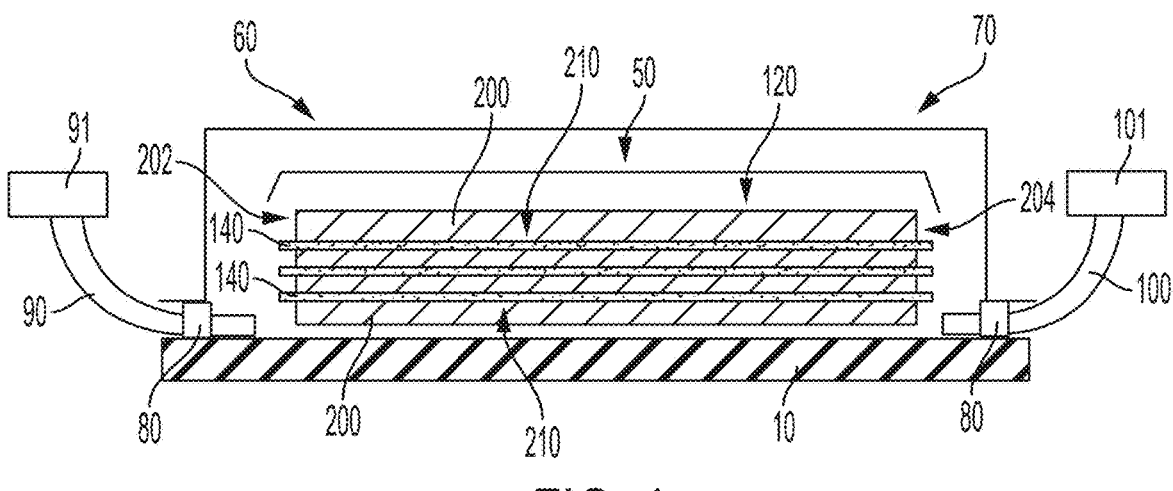
FIG. 4 is a schematic illustration of a vacuum bagging scheme for densification of the carbon-carbon composite structure according to one or more embodiments of the present disclosure.

The carbon-carbon composite structure 200 may be densified by reinfusing additional polymer resin into the carbon-carbon composite structure 200 and carbonizing the same. In one or more embodiments and with reference to FIG. 4, the method of making a carbon-carbon composite structure with internal microchannels may additionally include introducing a second sacrificial template 140 formed from a second sacrificial material into the microchannels 210 of the carbon-carbon composite structure 200 to generate a secondary assembly 120. The secondary assembly 120 may then be processed in a manner substantially similar to the processing of the primary assembly 20. Specifically, the secondary assembly 120 may be processed by placing the secondary assembly 120 under the sealed enclosure 70; applying a vacuum to the sealed enclosure 70 to evacuate air from within the sealed enclosure 70 and the secondary assembly 120; infusing a polymer resin into the secondary assembly 120 to generate a resin infused secondary assembly; heating the resin infused secondary assembly under vacuum to cure the polymer resin in the resin infused secondary assembly to form a cured densified composite; and heating the cured densified composite to an elevated temperature of at least 800° C. under a flow of an inert gas to carbonize the cured densified composite to form a densified iteration of the carbon-carbon composite structure.

In accordance with one or more embodiments, introducing the second sacrificial template 140 and the re-infusing of the polymer resin into the carbon-carbon composite structure 200, curing, and subsequent heating to the elevated temperature to carbonize the carbon-carbon composite structure 200 may be repeated. Specifically, the densified carbon-carbon composite structure may be reinfused with the polymer resin, followed by curing and subsequent heating to the elevated temperature to generate a carbon-carbon composite structure 200 which has been further densified. The densification of the carbon-carbon composite structure 200 from the repeated re-infusing of the polymer resin into the carbon-carbon composite structure 200, curing, and subsequent heating to the elevated temperature to carbonize the polymer resin in the cured densified composite generates a serial reduction in the accessible void space.

It will be appreciated that due to the presence of hollow microchannels 210 in the carbon-carbon composite structure 200, the process of densification is modified relative to methods typically employed by those skilled in the art to avoid such microchannels 210 from being filled with the polymer resin during the densification process. In accordance with one or more embodiments, densification of the carbon-carbon composite which forms the carbon-carbon composite structure 200 is achieved by introducing the second sacrificial template 140 into each microchannel 210 prior to the densification process. The re-introduction of a sacrificial material in the form of the second sacrificial template 140 effectively blocks the polymer resin from filling the microchannels 210 during the polymer infiltration and densification process.

In one or more embodiments the second sacrificial material may be a thermoplastic monofilament as previously disclosed with regards to the sacrificial template 40 as included in the primary assembly 20. Specifically, the thermoplastic monofilament forming the second sacrificial template 140 may be formed from nylon, acrylonitrile butadiene styrene (ABS), or polyethylene (PE). In one or more specific embodiments, the second sacrificial template 140 comprises nylon.

In one or more embodiments, the second sacrificial template 140 is fished through each of the microchannels 210. In one or more embodiments, the second sacrificial template 140 may comprise a diameter smaller than the sacrificial template 40 to case insertion of the second sacrificial template 140 into the microchannels 210. In one or more embodiments, the microchannels 210 may be cleaned to remove residual cured polymer resin and cleared of debris by passage and agitation of a rigid member into each microchannel 210. In one or more embodiments, a leading end of the second sacrificial template 140 may be trimmed or manufactured with a section of reduced diameter to case insertion. Subsequently, the second sacrificial template 140 may be continually fed through the microchannel 210 until the trimmed or section of reduced diameter is fully passed through the microchannel 210 to leave second sacrificial template 140 of full diameter within the microchannel 210.

It will be appreciated that the various disclosed methods of casing insertion of the second sacrificial template 140 into the microchannels 210 including reduced diameter, microchannels cleaning, and trimming of the second sacrificial template 140 may be used in combination or may be omitted entirely in accordance with various embodiments.

In various embodiments, the second sacrificial material may be a wax, an epoxy, a cutectic salt mixtures, or low melting alloy which may be introduced in a liquid form into the microchannels 210 and then solidified. An example wax is VALTRON UltraLux, commercially available from Valtech Corporation (Pottstown, PA), which may be introduced into the microchannels 210 at approximately 105° C. or greater. An example epoxy is JETSET Mounting Epoxy, commercially available from ULTRA TEC Manufacturing Inc. (Santa Ana, CA), which may be introduced into the microchannels 210 at approximately 20° C. or greater. An example metal allow is CERROSAFE® CHAMBER CASTING ALLOY, commercially available from Brownells (Montezuma, IA), which may be introduced into the microchannels 210 at approximately 80° C. or greater.

The second sacrificial template 140 serves to block intrusion of the polymer resin into the microchannels 210 during reinfusion and densification processes. In one or more embodiments and with reference to FIG. 4, the second sacrificial template 140 extends from the first end of the carbon-carbon composite structure 202 to the second end of the carbon-carbon composite structure 204 and fills the substantial entirety of the microchannels 210 of the carbon-carbon composite structure 200. It will be appreciated that any channel geometry may be filled with resin without the second sacrificial template 140 occupying the space, including locations where multiple inserted second sacrificial templates 140 butt together within the microchannel 210. However, the de minimis amount resin cured in these locations may be cleared using a flushing method.

Figure 5:
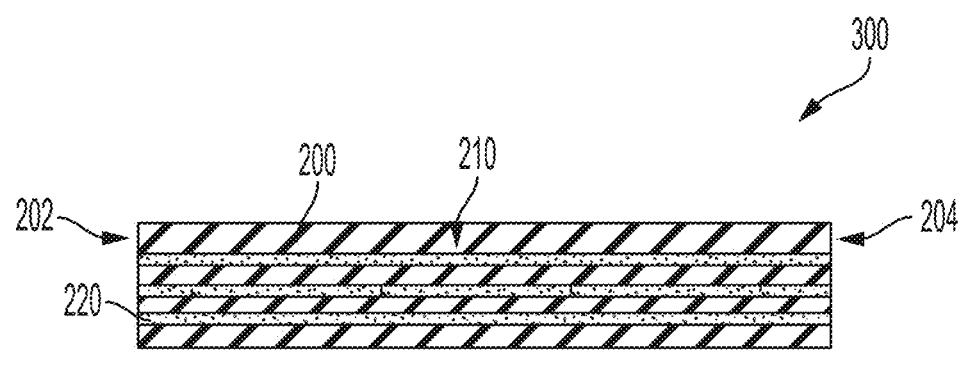
FIG. 5 is a schematic illustration of carbon-carbon composite cooling structure according to one or more embodiments of the present disclosure.

Having described the making a carbon-carbon composite structure 200 with internal microchannels 210, with reference to FIG. 5, the configuration and details of the resulting carbon-carbon composite cooling structure 300 are provided. Generally, the carbon-carbon composite cooling structure 300 comprises a carbon-carbon composite 200 comprising microchannels 210 extending in a continuous manner from a first end of the carbon-carbon composite 202 to a second end of the carbon-carbon composite 204 and a cooling fluid 220 which is flowed through the microchannels 210.

In one or more embodiments, the microchannels 210 of the carbon-carbon composite cooling structure 300 are interconnected to form a porous network of pathways through an interior of the carbon-carbon composite cooling structure 300. In further embodiments, the microchannels 210 of the carbon-carbon composite cooling structure 300 are isolated to form a plurality of separate pathways through an interior of the carbon-carbon composite cooling structure 300.

In one or more embodiments, the cooling fluid 220 which is flowed through the microchannels 210 of the carbon-carbon composite cooling structure 300 is a liquid. According to one or more embodiments, the cooling fluid 220 may be water such that the cooling fluid 220 is a liquid at 30° C.

to 90° C. and a pressure of 0 pounds per square inch gauge (psig) to 20 psig. It will be appreciated that as the pressure is provided as a gauge pressure it is relative to the surrounding atmospheric pressure and the absolute pressure is thus dependent on the operational location of the carbon-carbon composite cooling structure 300. According to one or more embodiments, the cooling fluid 220 may be JP-10 fuel such that the cooling fluid 220 is a liquid at 0° C. to 150° C. and a pressure of 0 psig to 20 psig.

In one or more embodiments, the cooling fluid 220 which is flowed through the microchannels 210 of the carbon-carbon composite cooling structure 300 is a gas at 30° C. and 1 atm. According to one or more embodiments, the cooling fluid 220 may be air such that the cooling fluid 220 is a gas at 0° C. to 150° C. and a pressure of 0 psig to 20 psig. It will be appreciated that as the pressure is provided as a gauge pressure it is relative to the surrounding atmospheric pressure and the absolute pressure is thus dependent on the operational location of the carbon-carbon composite cooling structure 300.

In one or more embodiments, the carbon-carbon composite cooling structure 300 is integrated into the surface structure of a hypersonic vehicle. For purposes of this disclosure a hypersonic vehicle is a craft which reaches speeds in excess of five times the speed of sound. It will be appreciated that at hypersonic speeds substantial heat may be generated on exposed surfaces of a hypersonic vehicle which may have detrimental effects on the performance or structural integrity of the hypersonic vehicle. As such, integration of the carbon-carbon composite cooling structure 300 into the surface structure of a hypersonic vehicle allows for active cooling of one or more regions of the hypersonic vehicle. In one or more embodiments, the cooling fluid 220 comprises a fuel utilized for operation of the hypersonic vehicle.

In order that the previously described embodiments may be more easily understood, reference is made to the following example that illustrates one or more features of the present disclosure. The example is in no way intended to be limiting in scope.

Having described various embodiments, it should be understood that the various aspects of the method of making a carbon-carbon composite structure with internal microchannels and the carbon-carbon composite cooling structure formed in accordance with the same may be utilized in conjunction with various other aspects.

In a first aspect, the disclosure provides a method of making a carbon-carbon composite structure with internal microchannels. The method comprises (i) assembling a dry carbon fiber composite preform with a sacrificial template formed from a sacrificial material woven or placed into the dry carbon fiber composite preform to form a primary assembly, where the sacrificial template extends in a continuous manner from a first end of the dry carbon fiber composite preform to a second end of the dry carbon fiber composite preform; (ii) placing the primary assembly under a sealed enclosure; (iii) applying a vacuum to the sealed enclosure to evacuate air from within the sealed enclosure and the dry carbon fiber composite preform; (iv) infusing a polymer resin into the dry carbon fiber composite preform to generate a resin infused preform; (v) heating the resin infused preform under vacuum to cure the polymer resin in the resin infused preform to form a cured composite; (vi) demolding the cured composite; and (vii) heating the cured composite to an elevated temperature of at least 800° C. under a flow of an inert gas to decompose the sacrificial template to form the internal microchannels and carbonize the cured composite to form the carbon-carbon composite structure.

In a second aspect, the disclosure provides the method of the first aspect, in which the sacrificial template comprises a plurality of strands, fibers, or tapes which extend in a continuous manner from the first of the dry carbon fiber composite preform to the second end of the dry carbon fiber composite preform.

In a third aspect, the disclosure provides the method of the first or second aspect, in which the sacrificial template comprises thermoplastic monofilaments.

In a fourth aspect, the disclosure provides the method of any of the first through third aspects, in which the sacrificial template comprises nylon.

In a fifth aspect, the disclosure provides the method of any of the first through fourth aspects, in which the sacrificial template is placed into the dry carbon fiber composite preform to form the primary assembly using a Tailored Fiber Placement (TFP) process.

In a sixth aspect, the disclosure provides the method of any of the first through fifth aspects, in which the microchannels have a longest cross-sectional dimension of 100 to 2000 microns.

In a seventh aspect, the disclosure provides the method any of the first through sixth aspects, in which the method further comprises: (viii) introducing a second sacrificial template formed from a second sacrificial material into the microchannels of the carbon-carbon composite structure created in step (vii) to generate a secondary assembly; and (ix) repeating steps (ii) to (vii) with the secondary assembly in place of the primary assembly.

In an eighth aspect, the disclosure provides the method of the seventh aspect, in which the second sacrificial material is thermoplastic monofilaments, wax, epoxy, eutectic salt mixtures, or low melting alloy.

In a ninth aspect, the disclosure provides the method of the seventh or eighth aspect, in which steps (viii) and (ix) are repeated at least one time.

In a tenth aspect, the disclosure provides the method of any of the first through ninth aspects, in which the sealed enclosure comprises a vacuum bag.

In an eleventh aspect, the disclosure provides the method of any of the first through tenth aspects, in which the vacuum applied in step (iii) is 25 inches of Hg of greater.

In twelfth aspect, the disclosure provides the method of any of the first through eleventh aspects, in which the vacuum applied in step (iv) is 25 inches of Hg of greater.

In a thirteenth aspect, the disclosure provides the method of any of the first through twelfth aspects, in which the elevated temperature of step (vii) is at least 1200° C.

In a fourteenth aspect, the disclosure provides the method of any of the first through thirteenth aspects, in which the polymer resin is selected from polyimide resin, phenolic resin, benzoxazine, phthalonitrile, cyanate ester, MG resin, or combinations thereof.

In a fifteenth aspect, the disclosure provides the method of any of the seventh through ninth aspects, in which the secondary assembly is held under vacuum for an infusion holding period to allow the polymer resin to infuse into the carbon-carbon composite structure created in step (vii) and fill accessible void space in the carbon-carbon composite structure.

In a sixteenth aspect, the disclosure provides the method of the fifteenth aspect, in which a pressure is applied to the secondary assembly subsequent to or in conjunction with the infusion holding period to force the polymer resin into the accessible void space in the carbon-carbon composite structure.

In a seventeenth aspect, the disclosure provides a carbon-carbon composite cooling structure. The carbon-carbon composite cooling structure comprises a carbon-carbon composite comprising microchannels extending in a continuous manner from a first end of the carbon-carbon composite to a second end of the carbon-carbon composite; and a cooling fluid, wherein the cooling fluid is flowed through the microchannels.

In an eighteenth aspect, the disclosure provides the structure of the seventeenth aspect, in which the microchannels have a longest cross-sectional dimension of 100 to 2000 microns.

In a nineteenth aspect, the disclosure provides the structure of the seventeenth or eighteenth aspect, in which the microchannels are interconnected to form a porous network of pathways through an interior of the carbon-carbon composite cooling structure.

In a twentieth aspect, the disclosure provides the structure of any of the seventeenth through nineteenth aspects, in which the cooling fluid comprises a liquid.

In a twenty-first aspect, the disclosure provides the structure of any of the seventeenth through twentieth aspects, in which the cooling fluid comprises a gas.

In a twenty-second aspect, the disclosure provides the structure of any of the seventeenth through twenty-first aspects, in which the carbon-carbon composite cooling structure is integrated into the surface structure of a hypersonic vehicle.

In a twenty-third aspect, the disclosure provides the structure of the twenty-second, in which the cooling fluid comprises a fuel utilized for operation of the hypersonic vehicle.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

It should be understood that any two quantitative values assigned to a property or measurement may constitute a range of that property or measurement, and all combinations of ranges formed from all stated quantitative values of a given property or measurement are contemplated in this disclosure.

As used here and in the appended claims, the words "comprise," "has," and "include" and all grammatical variations thereof are each intended to have an open, non-limiting meaning that does not exclude additional elements or steps.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A carbon-carbon composite cooling structure comprising:
    a carbon-carbon composite comprising microchannels extending in a continuous manner from a first end of the carbon-carbon composite to a second end of the carbon-carbon composite; and
    a cooling fluid,
    wherein the carbon-carbon composite cooling structure is integrated into the surface structure of a hypersonic vehicle,
    wherein the cooling fluid comprises a fuel utilized for operation of the hypersonic vehicle; and
    wherein the cooling fluid is flowed through the microchannels in a convective cooling process.

2. The carbon-carbon composite cooling structure of claim 1, wherein the microchannels have a longest cross-sectional dimension of 100 to 2000 microns.

3. The carbon-carbon composite cooling structure of claim 1, wherein the microchannels form up to 50% of a total cross section of the carbon-carbon composite structure.

4. The carbon-carbon composite cooling structure of claim 3, wherein the microchannels form 10% to 50% of the total cross section of the carbon-carbon composite structure.

5. The carbon-carbon composite cooling structure of claim 1, wherein the microchannels are interconnected to form a porous network of pathways through an interior of the carbon-carbon composite cooling structure.

6. The carbon-carbon composite cooling structure of claim 1, wherein the cooling fluid comprises a liquid.

7. The carbon-carbon composite cooling structure of claim 1, wherein the cooling fluid comprises a gas.

8. The carbon-carbon composite cooling structure of claim 1, wherein the cooling fluid comprises JP-10 fuel.

9. The carbon-carbon composite cooling structure of claim 1, wherein the carbon-carbon composite has been densified with repeated infusion and carbonization of a polymer resin into the carbon-carbon composite.

10. The carbon-carbon composite cooling structure of claim 1, wherein the microchannels comprise a circular profile.

11. The carbon-carbon composite cooling structure of claim 1, wherein the microchannels comprise an oval profile.

12. The carbon-carbon composite cooling structure of claim 1, wherein the microchannels comprise a polygonal profile.

\* \* \* \* \*